US007355546B2

(12) United States Patent
Randall

(10) Patent No.: US 7,355,546 B2
(45) Date of Patent: Apr. 8, 2008

(54) POLARIZATION AND FREQUENCY DIVERSE RADAR SYSTEM FOR COMPLETE POLARIMETRIC CHARACTERIZATION OF SCATTERERS WITH INCREASED SCANNING SPEED

(75) Inventor: Mitch Randall, Longmont, CO (US)

(73) Assignee: Advanced Radar Corporation, Westminster, CO (US)

( * ) Notice: Subject to any disclaimer, the term of this patent is extended or adjusted under 35 U.S.C. 154(b) by 199 days.

(21) Appl. No.: 11/325,262

(22) Filed: Jan. 3, 2006

(65) Prior Publication Data

US 2007/0152867 A1  Jul. 5, 2007

(51) Int. Cl.
    *G01S 13/95* (2006.01)
(52) U.S. Cl. ............... 342/26 R; 342/26 D; 342/104; 342/188; 342/189; 342/195
(58) Field of Classification Search ............ 342/26 R, 342/26 A, 26 B, 26 C, 26 D, 104, 188, 189, 342/195
See application file for complete search history.

(56) References Cited

U.S. PATENT DOCUMENTS

| 3,403,394 | A | * | 9/1968 | Rouault | ............ 342/188 |
| 5,778,026 | A | * | 7/1998 | Zak | .............. 375/219 |
| 6,411,824 | B1 | * | 6/2002 | Eidson | .............. 455/561 |
| 2007/0152867 | A1 | * | 7/2007 | Randall | ............ 342/26 R |
| 2007/0168341 | A1 | * | 7/2007 | Nichols et al. | ............. 707/4 |

OTHER PUBLICATIONS

"Use of copolar correlation coefficient for probing precipitation at nearly vertical incidence", Zrnic, D.S.; Balakrishnan, N.; Ryzhkov, A.V.; Durden, S.L. Geoscience and Remote Sensing, IEEE Transactions on vol. 32, Issue 4, Jul. 1994 pp. 740-748.*

* cited by examiner

Primary Examiner—John B Sotomayor
(74) Attorney, Agent, or Firm—Cochran Freund & Young LLC; James R. Young

(57) ABSTRACT

A method and apparatus is provided, whereby a scanning, polarization and frequency diverse radar system measures the complete polarimetric characterization of weather targets without loss of scanning speed and without an additional ambiguity in the Doppler velocity beyond that given by Nyquist's sampling theorem. In one embodiment, a linear combination of a horizontally and a vertically polarized signal are transmitted at a predetermined first frequency. Cotemporaneously or nearly cotemporaneously with the transmitted signal of the first frequency, a horizontally polarized signal is transmitted at a predetermined second frequency. Horizontal and vertical receive channels receive echoes at the predetermined first frequency to determine, but not limited to determine, the co-polar elements of the scattering matrix. Horizontal and vertical receive channels receive echoes at the predetermined second frequency to determine, but not limited to determine, the cross-polar elements of the polarization matrix. The predetermined first and second frequencies are selected to maximize isolation yet allow practical implementation.

12 Claims, 4 Drawing Sheets ial Applications No. 60/236,638, filed on Sep. 29, 2000,
POLARIZATION AND FREQUENCY DIVERSE RADAR SYSTEM FOR COMPLETE POLARIMETRIC CHARACTERIZATION OF SCATTERERS WITH INCREASED SCANNING SPEED

CROSS-REFERENCES TO RELATED APPLICATIONS

This patent application claims the benefit of U.S. Provisional Applications No. 60/236,638, filed on Sep. 29, 2000, and No. 60/259,681, filed on Jan. 4, 2001, each of which is incorporated herein by reference.

TECHNICAL FIELD

This invention relates to radar systems that transmit and/or receive multiply polarized beams of high frequency energy in a scanning mode to identify the presence, locus and characteristics of scatters in a region of space.

BACKGROUND OF THE INVENTION

The first radars for weather detection employed a single, fixed polarization transmission signal and receivers that were optimized to receive that particular polarization.

These first radars usually employed substantially linear polarization. Horizontal or Vertical polarization was most commonly used. It was less common to find single polarization scanning radars for weather detection that employ circular polarization or linear polarization at other than Horizontal or Vertical for a number reasons. One reason is that water droplets are asymmetric but aligned with vertical with respect to the surface of the Earth.

Since the first radars, it has been discovered that employing two or more fixed, orthogonal polarization signals in a radar is helpful in classifying and distinguishing targets such as distinguishing between essentially spherically symmetric ice particles and oblate water droplets. Polarization diversity also allows other advances and improvements over single polarization radars.

Polarization diversity can characterize a scatterer by what is known as the full polarimetric covariance matrix, which examines covariances between the co-polar and cross-polar received signals. The matrix consists of the 16 possible covariance combinations of the four possible time series from polarimetric scattering. They are $S_{AA}$, the signal received on the A polarization channel due to an A polarized transmit signal, $S_{AB}$, the signal received on the A polarization channel due to a B polarized transmit signal, $S_{BA}$, the signal received on the B polarization channel due to an A polarized transmit signal, and $S_{BB}$, the signal received on the B polarization channel due to a B polarized transmit signal. Here polarizations A and B refer to any two orthogonal basis polarizations that can be used. Due to the underlying physics and math, several of the 16 possible values are degenerate. Namely, by reciprocity, $S_{BA}$ and $S_{AB}$ are degenerate, and the covariance commutes (within a sign). This means that only a subset of all possible scattering scenarios and covariance computations are needed to generate the full polarimetric covariance matrix. The full polarimetric covariance matrix allows for complete polarimetric characterization of scatterers.

The covariances reveal the characteristics of the scatterer such as scattering coefficient, Doppler frequency, spectrum width, etc. Scattering coefficient relates to number and size of scatterers, Doppler frequency is directly proportional to the mean radial velocity of the scatterers. Spectrum width relates to turbulence within a sample volume. Some important parameters obtained from the full polarimetric covariance matrix are: Differential phase ($\Phi_{DP}$), Differential Reflectivity ($Z_{DR}$), Horizontal Reflectivity ($Z_H$), Vertical Reflectivity ($Z_V$), Correlation ($\rho_{HV}$), Linear Depolarization ($L_{DR}$).

For example, one of the elements of the matrix is the scattering amplitude of the target received on the Horizontal channel when illuminated with a Vertically polarized transmit pulse. Matrix parameters involving both polarizations are known as cross-polar. These polarization products are well known to those skilled in the art and are fully described in the literature, including detailed performance aspects determined through decades of field experiments. Cross-polar measurements are especially useful for particle identification measurements, such as ice detection. Cross-polar measurements require an antenna optimized for cross-polarization isolation (ICPR). Co-polar measurements are generally useful for determining total liquid water content.

Two general methods are used currently to implement polarization diversity. The first method relies on transmitting one of two polarizations in succession (usually alternately). The switching is normally accomplished using a high power A-B switch and an antenna with a separate feed for each polarization. The switch alternatively routes the transmit signal to one or the other of the antenna feeds depending on the polarization desired. Some systems use two high power amplifiers preceded by a similar switching arrangement. In other words the A-B switching is done at low powers prior to being amplified.

Two receivers are used to simultaneously receive co-polar and cross-polar returns for the scatterers. The full polarization matrix can be deduced (within certain limitations and using certain assumptions), but requires twice the number of transmit pulses (since each polarization is alternated) and hence the scan speed must be reduced by a factor of two to regain signal sensitivity and statistics. An additional ambiguity (beyond that given by the Nyquist sampling theorem) exists in the measurement of Doppler velocity using this technique. It is resolved by an assumption of typical scatterer behavior. However, in some cases this assumption is incorrect causing an erroneous Doppler velocity measurement.

A second method (referred to as 'simultaneous transmit' or '45 degree transmit') transmits a linear combination of Horizontally and Vertically polarized energy. This is usually accomplished using a high power splitter to simultaneously route the transmitter energy to the two feeds of a dual polarization antenna. A system with two high power amplifiers and appropriate drive circuitry can also be used. The result is in general elliptically polarized, but the signal processing techniques used can easily account for any amplitude and phase offsets encountered. With this technique, many but not all of the parameters of the scattering matrix can be deduced. This technique does not suffer the loss of scanning speed or include the additional ambiguity in Doppler velocity, as does the alternating scheme above. However, certain of the parameters in the scattering matrix that cannot be obtained with this technique are meteorologically significant.

What is needed is a polarization diverse radar system capable of measuring the full scattering matrix of weather targets (unlike the simultaneous transmit technique) without loss of scanning speed and without an additional ambiguity in the Doppler velocity (associated with the alternating polarization technique). It is therefore an object of the invention to provide a polarization diverse radar system to determine the full scattering matrix of scatterers. It is a further object of this invention to provide this measurement without the need to reduce the scanning speed. It is a further object of this invention to provide these measurements without an additional ambiguity in Doppler velocity beyond that required by the Nyquist sampling theorem.

SUMMARY OF THE INVENTION

In accordance with the invention, a radar system is provided a means of simultaneously transmitting a horizontally and vertically polarized pulse at a predetermined first frequency.

In accordance with the invention, a radar system is provided a means of transmitting a horizontally polarized pulse at a predetermined second frequency. This pulse is coincident or nearly coincident with the pulse transmitted at the predetermined first frequency.

In accordance with the invention a radar system is provided a means of receiving echoes returned from scatterers at said predetermined first frequency and polarized horizontally.

In accordance with the invention a radar system is provided a means of receiving echoes returned from scatterers at said predetermined first frequency and polarized vertically.

In accordance with the invention a radar system is provided a means of receiving echoes returned from scatterers at said predetermined second frequency and polarized horizontally.

In accordance with the invention a radar system is provided a means of receiving echoes returned from scatterers at said predetermined second frequency and polarized vertically.

In accordance with the invention there is provided a method and apparatus, whereby a scanning, polarization and frequency diverse radar system measures the complete polarimetric characterization of weather targets without loss of scanning speed and without an additional ambiguity in the Doppler velocity beyond that given by Nyquist's sampling theorem. In one embodiment, a linear combination of a horizontally and a vertically polarized signal are transmitted at a predetermined first frequency. Cotemporaneously or nearly cotemporaneously with the transmitted signal of the first frequency, a horizontally polarized signal is transmitted at a predetermined second frequency. Horizontal and vertical receive channels receive echoes at the predetermined first frequency to determine, but not limited to determine, the co-polar elements of the scattering matrix. Horizontal and vertical receive channels receive echoes at the predetermined second frequency to determine, but not limited to determine, the cross-polar elements of the polarization matrix. The predetermined first and second frequencies are selected to maximize isolation yet allow practical implementation.

BRIEF DESCRIPTION OF THE DRAWINGS

The accompanying drawings, which are incorporated in and form a part of the specification, illustrate the preferred embodiments of the present invention, and together with the written description and claims, serve to explain the principles of the invention. In the drawings:

DETAILED DESCRIPTION OF THE PREFERRED EMBODIMENTS

Figure 1:
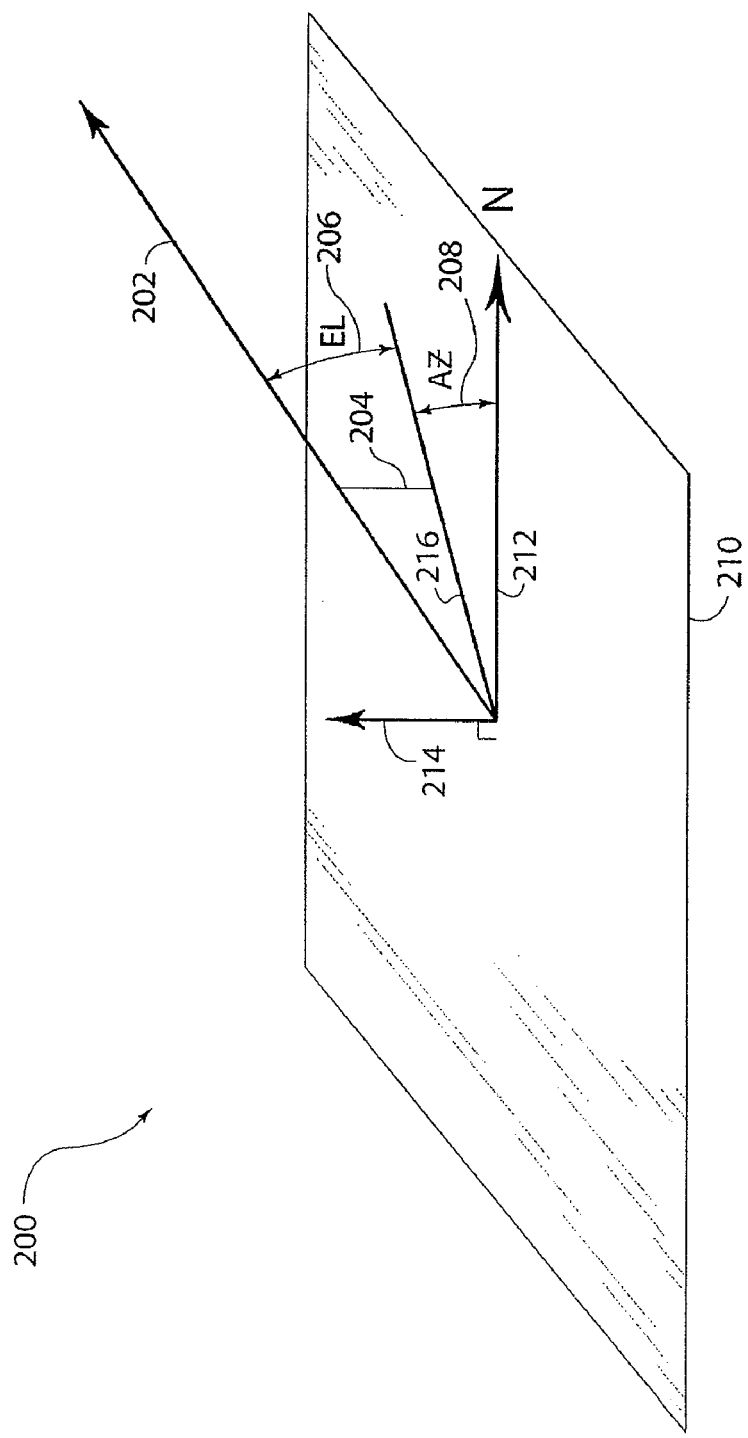
FIG. 1 illustrates the coordinate system of an azimuth and elevation gimbal.

For purposes of discussion, ground based radars will be assumed in which a gimbaled mount is used to scan a pencil beam antenna 32 in azimuth and elevation as per the general coordinate system 200 shown in FIG. 1. The reference plane 210 is assumed substantially parallel to the local surface of the Earth. The elevation angle 206 defines the pointing direction 202 of antenna 32. Zenith vector 214 is perpendicular to reference plane 210. The projection 216 of pointing direction 202 lying on plane 210 defines the azimuth angle 208 to a northern reference vector 212. An elevation angle of zero degrees is defined to point at the horizon (points lying in plane 210), and an elevation angle of 90 degrees is defined to point to the zenith 214. Azimuth angles 208 are defined about the zenith 214. The zero azimuth reference point is generally aligned to north 212. However, this is only by convention and does not affect the geometry. Radars employing ground-based scanners are introduced here only to simplify the following discussion. The principles herein can be applied to scanners on other or moving reference frames (such as aircraft), or scanners using various other coordinate systems (such as a polar mount).

By fixed polarization it is meant the single unique polarization of the traveling electromagnetic wave generated by the antenna 32, and with respect to the antenna 32 when excited through a particular input port such as inputs 28, 30 or in a particular way. An antenna 32 capable of transmitting one or more fixed polarizations and gimbaled to perform scanning will generate a traveling wave who's polarization with respect to a fixed coordinate system such as the Earth will not remain fixed as the antenna 32 scans. For that reason care has to be used to specify the elevation angle 206 and/or the azimuth angle 208 where needed to define a polarization.

For the purpose of this discussion, horizontal polarization is defined as substantially linear polarization with the E-field of the traveling electromagnetic wave parallel to the horizon (plane 210) when the elevation angle 206 of antenna 32 is zero. Vertical polarization is defined as substantially linear polarization with the E-field of the traveling electromagnetic wave perpendicular to the horizon (plane 210) when the elevation angle 206 of antenna 32 is zero. These are the generally accepted definitions known to those skilled in the art.

Figure 2:
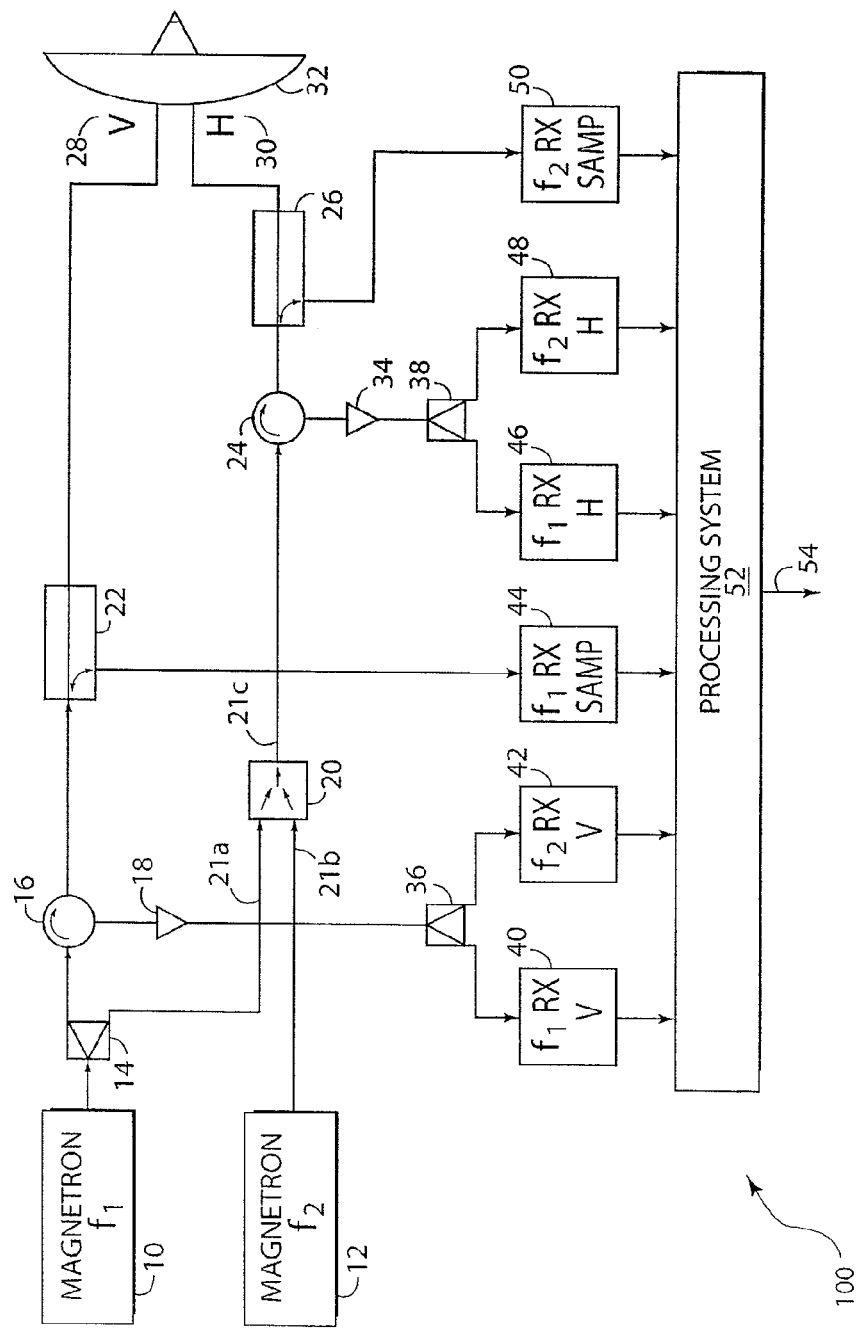
FIG. 2 illustrates a block diagram of the overall invention.

FIG. 2 shows a block diagram of the general system 100. Transmitter 10 generates a pulse of high frequency energy at a predefined first frequency. Splitter 14 divides the energy from transmitter 10 equally to two paths. One path travels through circulator 16, then through directional coupler 22 and into the V port 28 of antenna 32. Antenna 32 radiates this energy into a pencil beam with a specific polarization such as vertical. The other path of energy from splitter 14 is passed to frequency duplexer 20. Frequency duplexer 20 combines either of its inputs 21a, 21b to its output 21c with substantially no loss. Energy from transmitter 10 through splitter 14 and into frequency duplexer 20 input 21a therefore emerges at frequency duplexer 20 output 21c and flows to circulator 24. From circulator 24 the energy flows through directional coupler 26 and into H port 30 of antenna 32. Antenna 32 radiates this energy into a pencil beam with a specific polarization such as horizontal, and usually substantially orthogonal to that radiated as resulting from energy input into V port 28 of antenna 32.

A fraction of the energy passing from circulator 16 through directional coupler 22 to V port 28 of antenna 32 is coupled to receiver 44. Processing system 52 uses the detected signal from receiver 44 for calibration and coherent Doppler processing.

Energy incident on antenna 32 at a predefined first frequency as transmitted by transmitter 10 and having reflected from scatterers in the atmosphere emerges from V port 28 and H port 30 of antenna 32. The energy from V port 28 passes through directional coupler 22 and through circulator 16 to Low Noise Amplifier (LNA) 18. LNA 18 greatly amplifies the signal for subsequent reception and detection. Splitter 36 routes substantially equal amounts of the signal from LNA 18 to receiver 40 and receiver 42. Receiver 42 contains frequency selective electronics such that little output of receiver 42 arises from signals at the predetermined first frequency. Receiver 40 also contains frequency selective electronics that allow efficient detection of signals at the predetermined first frequency. The detected signal from receiver 40 is used by the processing system 52 to generate the complete polarimetric characterization 54 of scatterers.

The energy from H port 28 passes through directional coupler 26 and through circulator 24 to Low Noise Amplifier (LNA) 34. LNA 34 greatly amplifies the signal for subsequent reception and detection. Splitter 38 routes substantially equal amounts of the signal from LNA 34 to receiver 46 and receiver 48. Receiver 48 contains frequency selective electronics such that little output of receiver 48 arises from signals at the predetermined first frequency. Receiver 46 also contains frequency selective electronics that allow efficient detection of signals at the predetermined first frequency. The detected signal from receiver 46 is used by the processing system 52 to generate the complete polarimetric characterization 54 of scatterers.

Transmitter 12 generates a pulse of high frequency energy at a predefined second frequency. This energy is incident on frequency duplexer input 21*b* and is passed with substantially low loss to frequency duplexer output 21*c* and through circulator 24. From circulator 24 the energy passes through directional coupler 26 and into H port 30 of antenna 32.

A fraction of the energy passing from circulator 24 through directional coupler 26 to H port 30 of antenna 32 is coupled to receiver 50. Processing system 52 uses the detected signal from receiver 50 for calibration and coherent Doppler processing.

Energy incident on antenna 32 at a predefined second frequency as transmitted by transmitter 12 and having reflected from scatterers in the atmosphere emerges from V port 28 and H port 30 of antenna 32. The energy from V port 28 passes through directional coupler 22 and through circulator 16 to Low Noise Amplifier (LNA) 18. LNA 18 greatly amplifies the signal for subsequent reception and detection. Splitter 36 routes substantially equal amounts of the signal from LNA 18 to receiver 40 and receiver 42. Receiver 40 contains frequency selective electronics such that little output of receiver 40 arises from signals at the predetermined first frequency. Receiver 40 also contains frequency selective electronics that allow efficient detection of signals at the predetermined first frequency. The detected signal from receiver 42 is used by the processing system 52 to generate the complete polarimetric characterization 54 of scatterers.

The energy from H port 28 passes through directional coupler 26 and through circulator 24 to Low Noise Amplifier (LNA) 34. LNA 34 greatly amplifies the signal for subsequent reception and detection. Splitter 38 routes substantially equal amounts of the signal from LNA 34 to receiver 46 and receiver 48. Receiver 48 contains frequency selective electronics such that little output of receiver 48 arises from signals at the predetermined first frequency. Receiver 46 also contains frequency selective electronics that allow efficient detection of signals at the predetermined first frequency. The detected signal from receiver 46 is used by the processing system 52 to generate the complete polarimetric characterization 54 of scatterers.

Receivers 40, 42, 44, 46, 48, and 50 take as input a presumably weak signal modulated on a high frequency carrier, amplify and downconvert it to baseband and generate a stream of sampled, complex data (I's and Q's) for processing. In practice this is accomplished by a dual or triple hetrodyne process. A first frequency conversion mixes the high frequency input with a Stable Local Oscillator (STALO) resulting in a first intermediate frequency ($1^{st}$ IF). In a triple conversion system, another conversion occurs with a second local oscillator to generate a $2^{nd}$ IF. Finally, the IF is downconverted to baseband to generate inphase and quadrature (I and Q) signals. The I and Q signals are digitally sampled for use by a digital signal processor. Often modern receivers digitize the $2^{nd}$ IF and perform the final baseband conversion digitally.

Those skilled in the art understand that the H and V polarizations referred to in this discussion represent a typical set of polarizations, and that there are other possible sets of orthogonal or substantially orthogonal polarizations that can be used without changing the spirit or intent of the invention. It shall be understood that the H and V polarizations are used in this discussion as a particular set of polarizations, but in no way limit the scope of this disclosure to that particular set of polarizations. Other polarizations can be substituted for the stated H and V polarizations without changing the spirit and intent of the invention.

Similarly, those skilled in the art understand that the H and V polarizations referred to in this discussion can be constructed as a linear combination of other orthogonal or substantially orthogonal sets of polarizations. The scope of this invention includes the technique of reconstructing H and V equivalent polarizations using other polarization sets.

The particular receivers 40, 42, 44, 46, 48, and 50 shown in black-box form serve well to clearly illustrate the functionality, spirit and scope of the invention. However, an improved receiver system is given further below illustrating a more practical implementation while still providing the same functionality described above.

Figure 3:
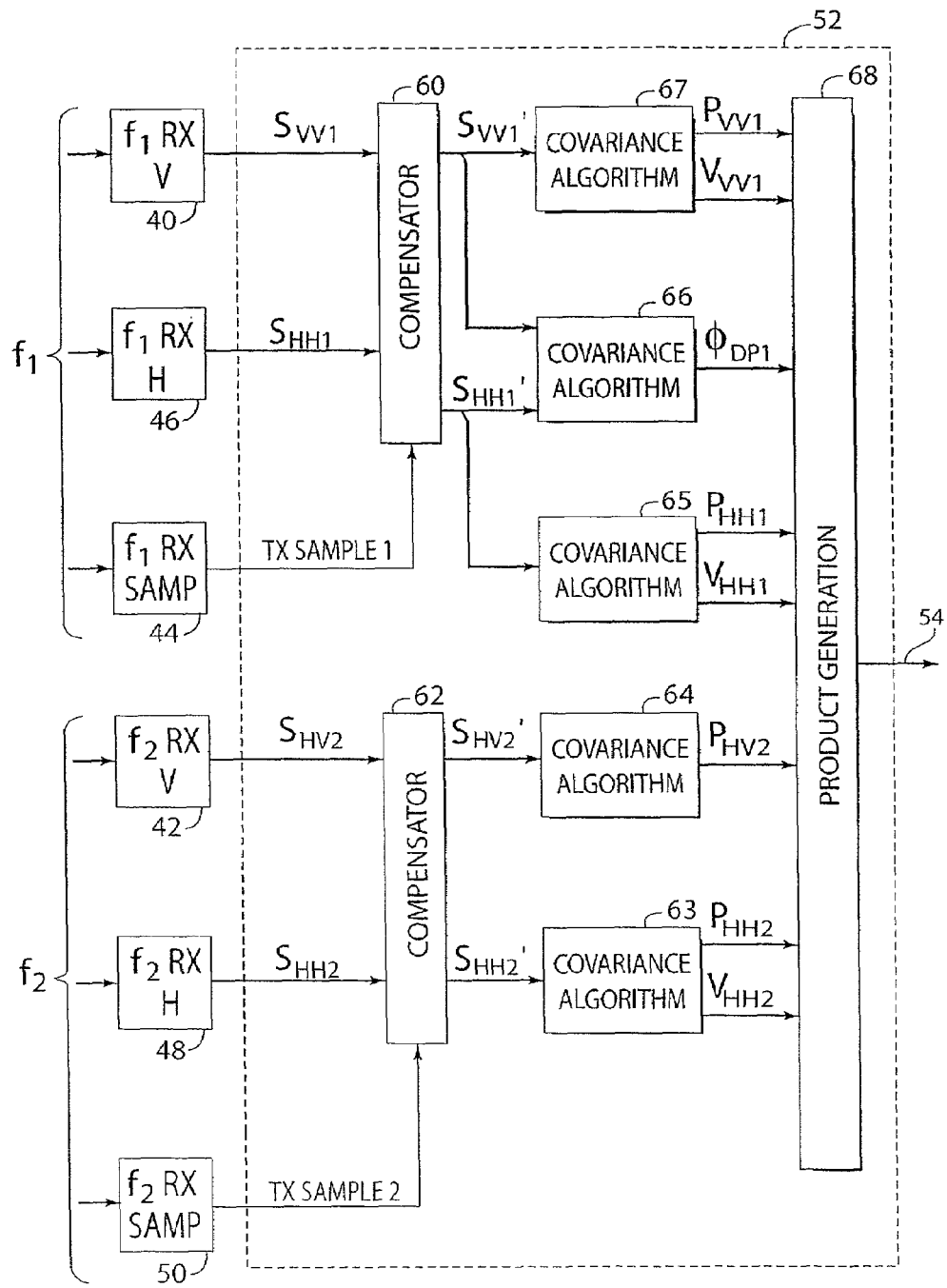
FIG. 3 illustrates the details of the processing system.

FIG. 3 shows processing system 52 in greater detail. Transmitters 10 and 12 may be coherent amplifiers such as a traveling wave tubes (TWT) or klystrons. They may also be magnetrons, which generate signals of unpredictable phase and relatively constant but somewhat uncertain frequency. Compensator 60 uses TX SAMPLE1 as received by receiver 44 and standard algorithms known to those skilled in the art to compensate the $S_{VV1}$ data from receiver 40 and the $S_{HH1}$ data from receiver 46 for the transmitter 10's random phase and/or fluctuating amplitude to generate coherent data $S_{VV1}'$ and $S_{HH1}'$ respectively. Coherent data $S_{VV1}'$ is used as input to covariance algorithm 67. Based on this input, covariance algorithm 67 generates power data $P_{VV1}$ and velocity data $V_{VV1}$. In the preferred embodiment, the covariance algorithm 67 used is the pulse pair algorithm, known by that name to those skilled in the art. However, other algorithms such as Fourier processing algorithms or other algorithms known to those skilled in the art could be used without departing from the spirit or scope of this invention. Outputs $P_{VV1}$ and $V_{VV1}$ are interpreted as the vertical co-polar power and velocity respectively for frequency $f_1$.

Coherent data $S_{HH1}'$ and $S_{VV1}'$ is used as input to covariance algorithm 66. Based on this input, covariance algorithm 66 generates power data differential phase data $\Phi_{DP1}$. In the preferred embodiment, the covariance algorithm 66 used is the pulse pair algorithm, known by that name to those skilled in the art. However, other algorithms such as Fourier processing algorithms or other algorithms known to those skilled in the art could be used without departing from the spirit or scope of this invention. Output $\Phi_{DP1}$ is interpreted as the differential phase respectively for frequency $f_1$.

Coherent data $S_{HH1}'$ is used as input to covariance algorithm 65. Based on this input, covariance algorithm 65 generates power data $P_{HH1}$ and velocity data $V_{HH1}$. In the preferred embodiment, the covariance algorithm 65 used is the pulse pair algorithm, known by that name to those skilled in the art. However, other algorithms such as Fourier processing algorithms or other algorithms known to those skilled in the art could be used without departing from the spirit or scope of this invention. Outputs $P_{HH1}$ and $V_{HH1}$ are interpreted as the horizontal co-polar power and velocity respectively for frequency $f_1$.

Coherent data $S_{HV2}'$ is used as input to covariance algorithm 64. Based on this input, algorithm 64 generates power data $P_{HV2}$. In the preferred embodiment, the covariance algorithm 64 is the pulse pair algorithm, known by that name to those skilled in the art. However, other algorithms such as Fourier processing algorithms or other algorithms known to those skilled in the art could be used without departing from the spirit or scope of this invention. Output $P_{HV2}$ is related to the linear depolarization ratio $L_{DR}$ for frequency $f_2$.

Coherent data $S_{HH2}'$ is used as input to algorithm 63. Based on this input, algorithm 63 generates power data $P_{HH2}$ and velocity data $V_{HH2}$. In the preferred embodiment, the covariance algorithm 63 is the pulse pair algorithm, known by that name to those skilled in the art. However, other algorithms such as Fourier processing algorithms or other algorithms known to those skilled in the art could be used without departing from the spirit or scope of this invention. Outputs $P_{HH2}$ and $V_{HH2}$ are interpreted as the horizontal co-polar power and velocity respectively for frequency $f_2$.

Product generator 68 combines the results from algorithms 63, 64, 65, 66, and 67 to form a complete polarimetric characterization 54 of scatterers. The final velocity estimate is a weighted combination of the three velocity estimates $V_{VV1}$, $V_{HH1}$, and $V_{HH2}$. Although the data $S_{VV1}'$ and $S_{HH1}'$ that result in $V_{VV1}$ and $V_{HH1}$ are highly correlated, they together are independent of the data $S_{HH2}'$ resulting in $V_{HH2}$. The independence arises from the use of two different predefined transmit frequencies $f_1$ and $f_2$. The weighted combination of velocity estimates from statistically independent data constitutes a 41% improvement in the variance of the resultant velocity estimate.

Differential reflectivity ($Z_{DR}$) is computed from frequency $f_1$ co-polar powers $P_{VV1}$ and $P_{HH1}$. Since differential reflectivity ($Z_{DR}$) is computed from data $S_{VV1}'$ and $S_{HH1}'$ of the same frequency $f_1$, and from the same instant in time, differential reflectivity measurement stability will be very high.

Differential phase ($\Phi_{DP}$) is also computed from frequency $f_1$ data $S_{VV1}'$ and $S_{HH1}'$. Since differential phase ($\Phi_{DP}$) is computed from data $S_{VV1}'$ and $S_{HH1}'$ of the same frequency $f_1$, and from the same instant in time, differential phase measurement stability will be very high.

Linear depolarization ($L_{DR}$) is computed from frequency $f_2$ co-polar power $P_{HH2}$ and cross-polar power $P_{HV2}$.

Reflectivity is derived from a weighted average of frequency $f_1$ co-polar power $P_{HH1}$ and frequency $f_2$ co-polar power $P_{HH2}$. The two co-polar powers $P_{HH1}$ and $P_{HH2}$ are independent estimates since they arise from transmitted signals of two different frequencies $f_1$, and $f_2$. The weighted combination of reflectivity estimates from statistically independent data constitutes a 41% improvement in the variance of the resultant reflectivity estimate.

Figure 4:
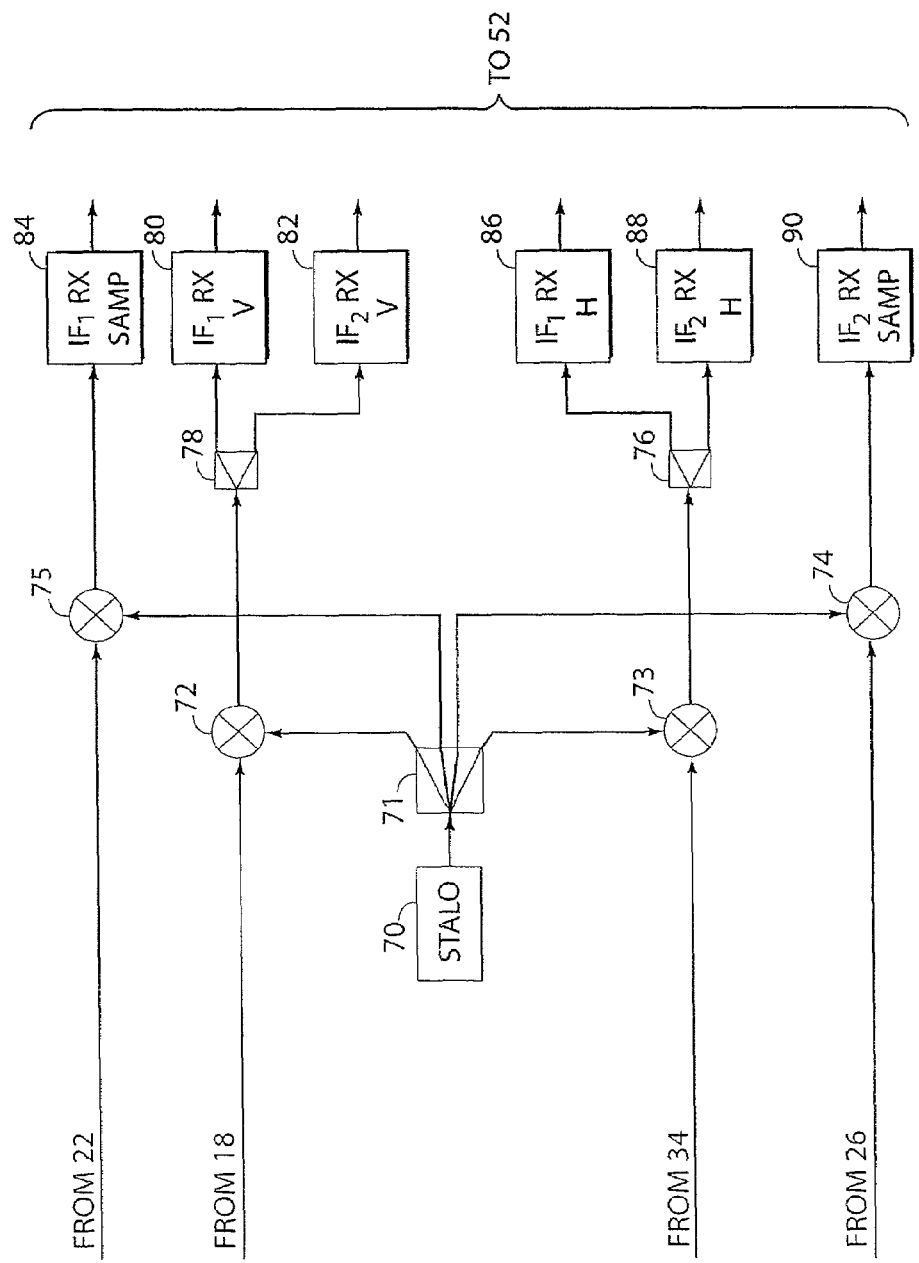
FIG. 4 illustrates an improved receiver configuration.

FIG. 4 shows an improved receiver chain designed around a set of IF receivers 80, 82, 84, 86, 88, and 90. This improvement does not depart from the spirit and scope of the invention but offers a simplified means of implementing receivers for the various signals in the present system.

The system of FIG. 4 replaces splitters 36, 38 and receivers 40, 42, 44, 46, 48, and 50 of FIG. 3. The output previously supplied by receiver 40 will then be supplied by IF receiver 80. The output previously supplied by receiver 42 will then be supplied by IF receiver 82. The output previously supplied by receiver 44 will then be supplied by IF receiver 84. The output previously supplied by receiver 46 will then be supplied by IF receiver 86. The output previously supplied by receiver 48 will then be supplied by IF receiver 88. The output previously supplied by receiver 50 will then be supplied by IF receiver 90.

The output of STALO 70 is split four ways by splitter 71. The four splitter 71 signals drive frequency mixers 72, 73, 74, and 75. The signal from directional coupler 22 is mixed down by mixer 75 to a $1^{st}$ IF frequency and received by IF receiver 84. The output of LNA 18 is mixed down by mixer 72 to a $1^{st}$ IF frequency. The $1^{st}$ IF frequency output of mixer 72 is then split by splitter 78 and received by IF receiver 80 tuned for IF frequency $IF_1$ and IF receiver 82 tuned for IF frequency $IF_2$.

The signal from directional coupler 26 is mixed down by mixer 74 to a $1^{st}$ IF frequency and received by IF receiver 90. The output of LNA 34 is mixed down by mixer 7.3 to a $1^{st}$ IF frequency. The $1^{st}$ IF frequency output of mixer 73 is then split by splitter 76 and received by IF receiver 86 tuned for IF frequency $IF_1$ and IF receiver 88 tuned for IF frequency $IF_2$.

A practical implementation of the diagram of FIG. 4 applies constraints to predetermined frequencies $f_1$, and $f_2$. If the frequencies $f_1$, and $f_2$ differ too greatly, IF receivers 80, 82, 84, 86, 88, and 90 will not be able to practically receive one or both signals. However, if the frequencies differ too little, frequency discrimination and hence isolation between channels will suffer. Within these constraints there is a range of frequency spacings giving adequate isolation, yet within a reasonable tenability range for practical IF receivers.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention; The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. A polarization diverse radar for estimating scattering matrix parameters of scatterers in a volume, comprising:
- a transmitter operating at a predetermined first frequency and feeding an antenna to produce a radiated signal comprising a linear combination of a first polarization, and a second polarization orthogonal to said first polarization;
- a transmitter operating at a predetermined second frequency and feeding an antenna to produce a radiated signal at said first polarization;
- a plurality of receivers, tuned to said predetermined first frequency, and an antenna to receive echo signals of a plurality of substantially orthogonal polarizations returned from scatterers in a volume illuminated by said radiated signal at said predetermined first frequency; and
- a plurality of receivers, tuned to said predetermined second frequency, and an antenna to receive echo signals of a plurality of substantially orthogonal polarizations returned from scatterers in a volume illuminated by said radiated signal at said predetermined second frequency.

2. The polarization diverse radar of claim 1, wherein a processor system uses said echo signals to estimate scattering matrix parameters for said scatterers in a volume.

3. The polarization diverse radar of claim 1, wherein a processor system uses said echo signals to estimate the radial velocity of said scatterers in a volume.

4. The polarization diverse radar of claim 1, wherein a processor system uses said echo signals, samples of said transmitted signal at a predetermined first frequency, and samples of said transmitted signal at a predetermined second frequency to estimate the radial velocity of said scatterers in a volume.

5. The polarization diverse radar of claim 1, wherein a processor system uses said echo signals, samples of said transmitted signal at a predetermined first frequency, and samples of said transmitted signal at a predetermined second frequency to estimate scattering matrix parameters for said scatterers in a volume.

6. A method of estimating the radial velocity of scatterers in a volume, comprising:
- Applying a covariance algorithm to a linear combination of said echo signals received at a predetermined first frequency to obtain a first estimate of the first moment of echo statistics of said scatterers in a volume;
- Applying a covariance algorithm to a linear combination of said echo signals received at a predetermined second frequency to obtain a first estimate of the first moment of echo statistics of said scatterers in a volume; and
- Applying a weighted average of said first estimate and said second estimate of the first moment of echo statistics of said scatterers in a volume to compute a velocity estimate of said scatterers in a volume.

7. A method of estimating the radial velocity of scatterers in a volume, comprising:
- Correcting incoherent echo signals received at said predetermined first frequency using samples of said transmitted signal at said predetermined first frequency, to obtain coherent echo signals received at said predetermined first frequency;
- Applying a covariance algorithm to a linear combination of said coherent echo signals received at a predetermined first frequency to obtain a first estimate of the first moment of echo statistics of said scatterers in a volume;
- Correcting incoherent echo signals received at said predetermined second frequency using samples of said transmitted signal at said predetermined second frequency, to obtain coherent echo signals received at said predetermined second frequency;
- Applying a covariance algorithm to a linear combination of said coherent echo signals received at a predetermined second frequency to obtain a second estimate of the first moment of echo statistics of said scatterers in a volume; and
- Applying a weighted average of said first estimate and said second estimate of the first moment of echo statistics of said scatterers in a volume to compute a velocity estimate of said scatterers in a volume.

8. A method of estimating scattering matrix parameters of scatterers in a volume, comprising:
- Computing predetermined first frequency co-polar powers $P_{HH1}$ and $P_{VV1}$ using said echo signals received at said predetermined first frequency;
- Estimating differential reflectivity ($Z_{DR}$) from said predetermined first frequency co-polar powers $P_{VV1}$ and $P_{HH1}$;
- Computing predetermined second frequency co-polar power $P_{HH2}$ and cross-polar power $P_{HV2}$ using said echo signals received at said predetermined second frequency;
- Estimating linear depolarization ($L_{DR}$) from said predetermined second frequency co-polar power $P_{HH2}$ and cross-polar power $P_{HV2}$.

9. The method of claim 8, wherein the reflectivity of scatterers in a volume is estimated from a weighted average of said predetermined first frequency co-polar power $P_{HH1}$ and said predetermined second frequency co-polar power $P_{HH2}$.

10. The method of claim 8, wherein differential phase ($\Phi_{DP}$) of scatterers in a volume is estimated from said echo signals received at said predetermined first frequency.

11. The method of claim 8, wherein correlation of scatterers in a volume is estimated from said echo signals.

12. The method of claim 8, wherein correlation of scatterers in a volume is estimated from said echo signals and said samples of the transmitted signals.

* * * * *